(12) United States Patent
Diemer et al.

(10) Patent No.: US 6,568,521 B2
(45) Date of Patent: May 27, 2003

(54) CLUTCH DISK

(75) Inventors: Matthias Diemer, Niederwerrn (DE);
Andreas Orlamünder, Schweinfurt (DE); Andreas Dau, Würzburg (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/906,558

(22) Filed: Jul. 16, 2001

(65) Prior Publication Data

US 2002/0014388 A1 Feb. 7, 2002

(30) Foreign Application Priority Data

Aug. 3, 2000 (DE) .......................................... 100 37 894

(51) Int. Cl.⁷ .............................................. F16D 13/60
(52) U.S. Cl. ................. 192/107 R; 192/70.16
(58) Field of Search .................. 192/107 R, 70.17, 192/107 M, 70.16

(56) References Cited

U.S. PATENT DOCUMENTS

| | | | | |
|---|---|---|---|---|
| 3,194,347 A | * | 7/1965 | Hall ............................ | 188/18 |
| 3,759,354 A | * | 9/1973 | Dowell et al. ........ | 188/218 XL |
| 3,807,534 A | * | 4/1974 | Eldred .................. | 188/218 XL |
| 4,613,021 A | | 9/1986 | Lacombe et al. ..... | 188/218 XL |
| 4,646,900 A | * | 3/1987 | Crawford et al. ....... | 188/251 R |
| 4,697,684 A | | 10/1987 | Maycock et al. ....... | 192/107 R |
| 4,860,872 A | | 8/1989 | Flotow ................... | 192/107 R |
| 4,923,045 A | | 5/1990 | Kobayashi et al. ..... | 192/107 R |

* cited by examiner

*Primary Examiner*—Saul Rodriguez
(74) *Attorney, Agent, or Firm*—Cohen, Pontani, Lieberman & Pavane

(57) ABSTRACT

A clutch disk comprises a hub area designed for nonrotatable connection to a shaft and at least one friction lining element supported on a support area arranged radially outside the hub areas. A circumferential support surface for circumferential support of each friction lining element is provided on the support area at each circumferential end of each friction lining element.

18 Claims, 2 Drawing Sheets

CLUTCH DISK

BACKGROUND OF THE INVENTION

1. Field of the Invention

The present invention pertains to a clutch disk, comprising a hub area designed for nonrotatable connection to a shaft and at least one friction lining element, preferably a plurality of friction lining elements, supported on a support area and arranged in sequence around the circumference.

2. Description of the Related Art

It is generally known that the friction lining elements of clutch disks can be attached with rivets to a support area, which can be formed by, for example, the radially outer section of a cover disk element of the clutch disk. The rivets pass through openings in the friction lining elements and in the support area, with the result that certain areas of the surface of the friction lining elements are removed, and thus the surface area of the linings which can contribute to the production of friction is reduced.

SUMMARY OF THE INVENTION

It is the object of the present invention to provide a clutch disk in which the friction lining elements can be attached without any essential reduction in the friction surface provided by the elements.

This task is accomplished according to the invention by a clutch disk, comprising a hub area designed for nonrotatable connection to a shaft and at least one friction lining element, preferably a plurality of such elements, supported on a support area and arranged in sequence around the circumference.

It is also provided that a circumferential support surface for supporting the minimum of one friction lining element in the circumferential direction is provided on the support area at each circumferential end of the minimum of one friction lining element.

In the clutch disk according to the invention, therefore, the idea is not to provide the circumferential support by introducing clinch bolts or the like into the area occupied by the volume of the individual friction lining element, but rather to provide a torque-transmitting connection between the friction lining elements and the support area directly at the circumferential ends.

For example, it can be provided that an individual circumferential support area comprises a support edge or support surface on the support area, which extends in the radial direction from the inside toward the outside. In this way, a connection with a relatively large area which pulls in the circumferential direction is obtained which does not impose undue stress on the friction lining elements. The support surface or edge can, for example, be provided on a disk element forming the support area.

So that the friction lining element can also be secured in the axial direction at the same time, the minimum of one friction lining element has a retaining recess extending in the radial direction from the inside toward the outside in at least one of the circumferential end areas, into which recess the part of the support area which forms the support surface or support edge fits.

In an alternative design, the friction lining element has a carrier element and a friction lining on at least one of the two axial ends of this element, the circumferential end areas of the carrier element being supported in the circumferential direction on the support area. In this design, therefore, a direct action of the support area on the friction lining elements is avoided, with the advantage that the friction lining elements can be designed with greater freedom with respect to the materials of which they are made.

To be able to reduce the occurrence of frictional vibrations induced by possible local changes in the coefficient of friction at a pressure plate or a flywheel, especially when the clutch is slipping, it is proposed that at least one circumferential end area of the carrier element be supported on the support area by way of an intermediate elastic damping assembly.

The friction lining elements and the support area can be held together, for example, by providing the support area with recesses, which extend radially from the inside to the outside, in the parts of the support area which support the carrier element, into which recesses the circumferential ends of the carrier elements fit. It is advantageous for the elastic damping assembly to comprise elastic material in at least one recess.

So that the friction lining elements can also be secured in the radial direction on the support area in the clutch disk according to the invention without the need to introduce clinch bolts or the like, a radial support arrangement for supporting the minimum of one friction lining element on the support area radially from the outside can be provided.

A design which is especially easy to realize can be obtained by designing the radial support arrangement so that it comprises the two circumferential support surfaces of the support area assigned to the circumferential ends of the minimum of one friction lining element, where at least certain parts of these two circumferential support surfaces converge toward each other as they proceed radially from the inside to the outside. As a result of the circumferential support surfaces which approach each other as they proceed radially toward the outside, ultimately a clamping effect for the friction lining elements is produced in the radially outward direction.

Alternatively or in addition, however, it is also possible for the radial support arrangement on the support area to comprise at least one radial support section which extends over the minimum of one friction lining element on the radially outward side.

The present invention also pertains to a friction clutch with a clutch disk according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 3:
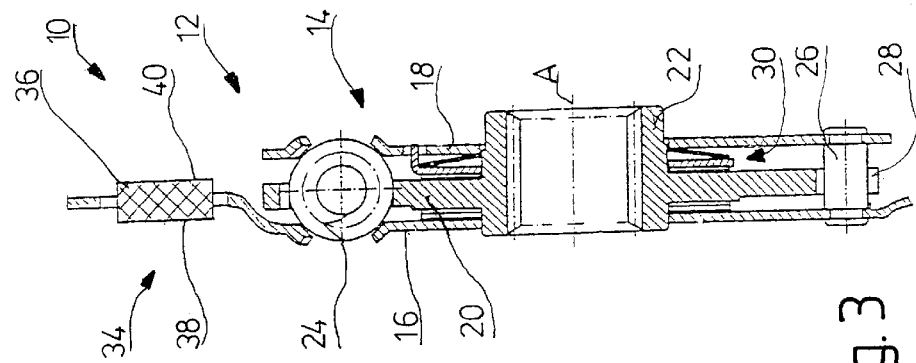
FIG. 3 shows another longitudinal cross section along line III—III of FIG. 1.
Figure 2:
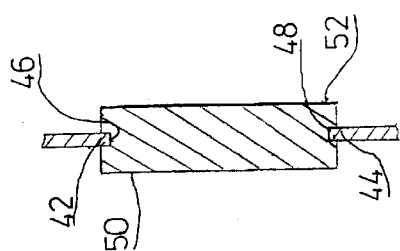
FIG. 2 shows a partial longitudinal cross section along line II—II of FIG. 1.
Figure 1:
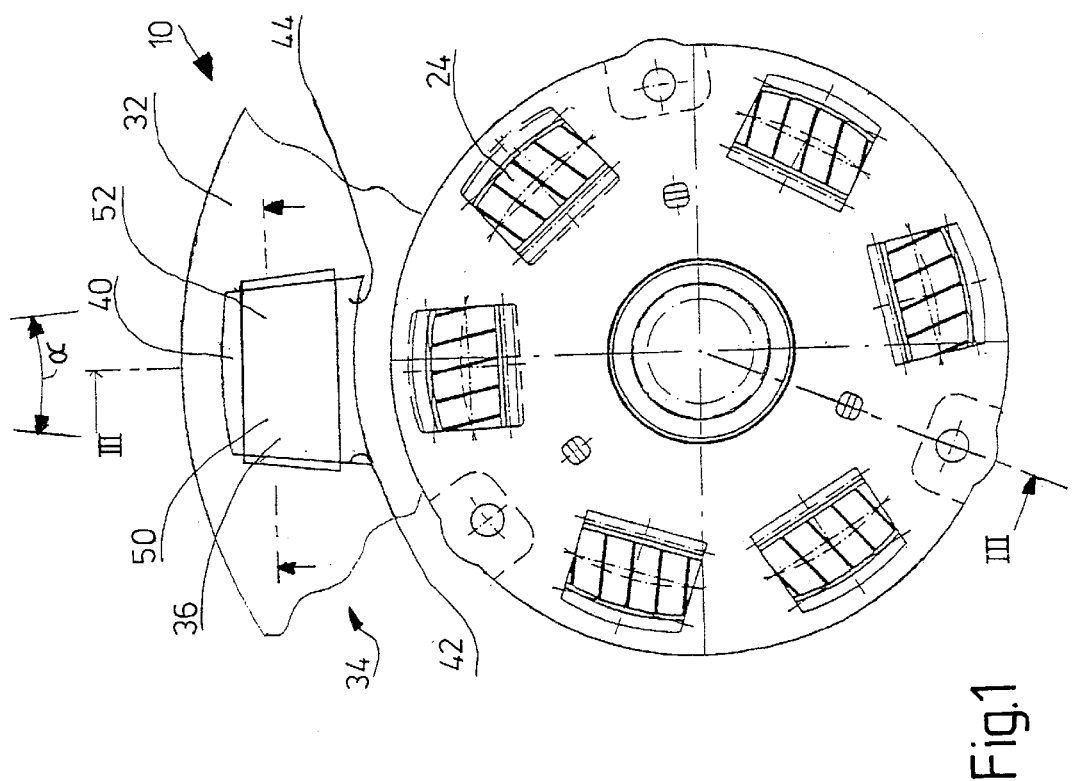
FIG. 1 shows a partial axial view of a clutch disk according to the invention.

FIGS. 1–3 show a first embodiment of a clutch disk 10 according to the invention. The hub area 12 comprises a torsional vibration damper 14 with two cover disk elements 16, 18, which are a certain axial distance apart and rigidly connected to each other. Between these two cover disk elements 16, 18 is a central disk element 20, which is connected radially on the inside to a hub 22, preferably forming an integral part thereof. The hub 22 is designed to be connected in a nonrotatable but axially movable manner to a power takeoff shaft such as a transmission input shaft. The cover disk elements 16, 18 and the central disk element 20 have spring windows, in which spring elements 24 of the torsional vibration damper 14 are installed. In a manner known in and of itself, the springs 24 are supported circumferentially against guide edges of the cover disk elements 16, 18 and of the central disk element 20. As a result, the two cover disk elements 16, 18 are able to move around a rotational axis A within a limited angular range relative to the central disk element 20. The bolt elements 26, which fit into appropriate circumferential holes 28 in the central disk element 20, limit the angle of rotation of the two cover disk elements 16, 18. A frictional damping device 30 can also act between the cover disk elements 16, 18 and the central disk element 20.

The cover disk element 16 is extended radially outward and forms there, in cooperation with an area 32, which is possibly ring-shaped, a support area 34. In this radially outer support area 34 of the hub area 12, several friction lining elements 36 are arranged in sequence around the circumference. These elements have axially facing friction surfaces 38, 40, which are intended to interact frictionally with an opposing friction surface of, for example, a flywheel and a pressure plate. It can be seen in FIG. 1 that the support area 34 has an aperture 40 for each friction lining element 36, these apertures being limited by support edges or support surfaces 42, 44 at the two circumferential ends. Radially outward extensions of these edges or surfaces 42, 44 intersect at an angle α. That is, these support surfaces 42, 44 approach each other as they extend radially from the inside toward the outside. The friction lining element 36 to be held in each aperture 40 has a corresponding shape which tapers down radially toward the outside, at least in the area of the groove-like recesses 46, 48, into which the associated circumferential support areas 42, 44 fit.

As a result of the cooperation between the circumferential support areas 42, 44 and the associated circumferential ends 50, 52 of the individual friction lining element or of the groove-like recesses 46, 48 provided therein, the friction lining elements 36 and the support area 34 are connected in the circumferential direction. Because of the presence of the groove-like recesses 46, 48, furthermore, it is also achieved that the friction lining elements 36 are secured on the support area 34 in the axial direction. Finally, the circumferential support surfaces 42, 44, which approach each other as they extend radially toward the outside, also provide radial support, because the friction lining elements 36 are clamped between these two circumferential support surfaces 42, 44 under the effect of centrifugal force. The angle at which these two circumferential support surfaces approach each other is preferably such that a self-locking effect occurs; that is, once the friction lining elements 36 have been pushed radially outward, they are unable to slip radially back inward again when the centrifugal force decreases.

In this embodiment, it would also be possible in principle for the cover disk element 18 to be extended outward in the radial direction like the cover disk element 16 and to be provided with a ring-like area 32 either instead of or in addition to the ring-like area of the cover disk element 16. In addition, it would also be possible to omit the groove-like recesses 46, 48 in the circumferential ends 50, 52 of the friction lining elements 36, so that axial retention is achieved as a result of pretension and clamping under the effect of centrifugal force.

Figure 4:
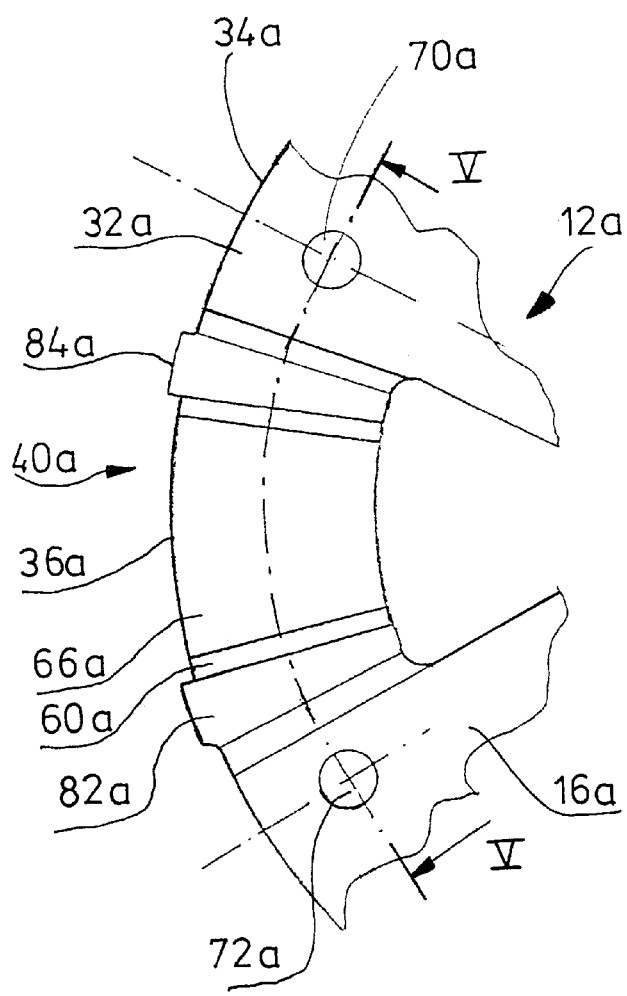
FIG. 4 shows a partial axial view of an alternative design of the clutch disk according to the invention in the radially outer support area.
Figure 5:
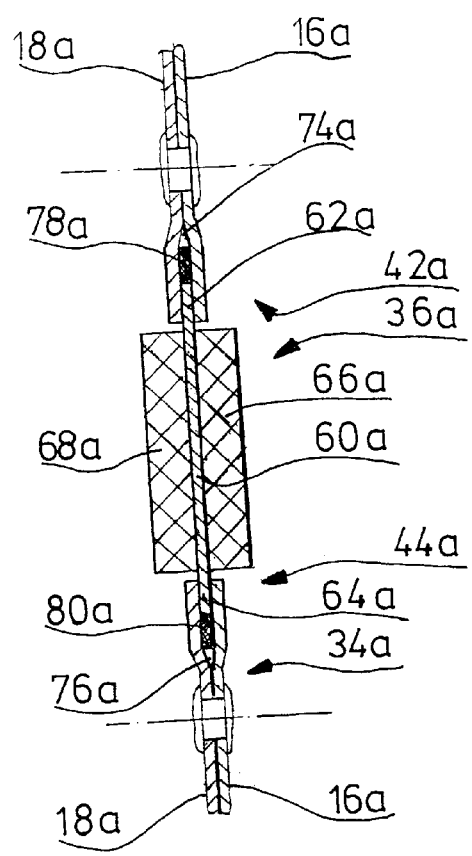
FIG. 5 shows a cross-sectional view along line V—V of FIG. 4.

An alternative design of a clutch disk according to the invention, i.e., of the attachment of the friction lining elements to the support area of same, is shown in FIGS. 4 and 5. Components which correspond to previously described components with respect to design and/or function are designated by the same reference number plus the letter "a".

It can be seen in FIG. 5 that the friction lining elements 36a comprise here a carrier element 60a, the circumferential ends 62a, 64a of which extend beyond the associated friction lining elements 66a, 68a, which are, for example, glued, riveted, or soldered, etc., to the two axial sides of the carrier element.

The two cover disk elements 16a, 18a are designed to rest against each other in their radially outer, ring-shaped areas 32a and are rigidly connected to each other by rivets 70a, 72a, one on each side of the openings 40a, which are no longer closed on the radially inward and outward sides. Near the openings 40a, the two cover disk elements 16a, 18a are bent axially away from each other to form between them recesses 74a, 76a, which extend essentially in the radial direction from the inside to the outside. The rivets do not extend axially above the bent away portions of the cover disk elements. The circumferential ends 62a, 64a of the carrier element 60a fit into these recesses 74a, 76a and are supported there with respect to the support areas 34a by areas of elastic material 78a, 80a in the circumferential direction. The elastic material 78a, 80a can, for example, be a rubber material, which is clamped between the two cover disk elements 16a, 18a. The two sections of the cover disk elements 16a, 18a which have been drawn away from each other and the elastic materials 78a, 80a situated between them form circumferential support areas 42a, 44a in this embodiment. So as to provide not only circumferential and axial support but also support radially from the outside, the area of at least one of the cover disk elements 16a, 18a which has been bent away from the other cover disk element can have retaining tabs 82a, 84a, which are bent over in the axial direction, against which the circumferential ends 64a, 62a of the carrier element 60a can be supported radially from the outside. It should also be pointed out that, in this embodiment, a carrier element 60a could carry only one friction lining 66a or 68a. In this case, for example, two of these carrier elements 60a, each with a friction lining facing in a different axial direction, would be inserted into an opening 40a. If it is not necessary to provide the elastic materials 78a, 80a to damp circumferential movement, especially to prevent the occurrence of frictional vibrations, the circumferential ends 62a, 64a of the carrier element 60a can also be supported in the circumferential direction directly against the areas of the cover disk elements 16a, 18a where they converge together.

The embodiments described above pertain to clutch disks in which the friction lining elements 36; 36a can be connected rigidly to the hub area of the clutch disk without any rivets passing through them, this also being possible in cases where the hub area has a torsional vibration damper. This simplifies the production process but also ensures at the same time that the available frictional surface is increased.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch disk comprising
   a hub area designed for nonrotatable connection to a shaft,
   a support area arranged radially outside of said hub area, said support area having at least one pair of circumferentially opposed support surfaces, and
   a friction lining element disposed between each said pair of circumferential support surfaces, each said friction lining element comprising a carrier element and at least one axially facing friction lining formed separately from said carrier element and fixed to said carrier element, each said carrier element having a pair of circumferentially opposed ends which extend circumferentially beyond said friction linings and are supported by respective opposed support surfaces.

2. A clutch disk as in claim 1 wherein said support area has a plurality of apertures arranged in circumferential sequence, a plurality of said friction lining elements being arranged in respective said apertures, each said aperture being bounded by a pair of said support surfaces.

3. A clutch disk as in claim 1 wherein each said support surface extends substantially radially.

4. A clutch disk as in claim 3 wherein said support area comprises a disk element, said support surfaces being formed on said disk element.

5. A clutch disk as in claim 3 wherein each said end of said friction lining element has a recess which receives a respective said support surface therein.

6. A clutch disk as in claim 1 further comprising an elastic damping element between at least one of said circumferential ends and the respective said support surface.

7. A clutch disk as in claim 1 wherein each said support area comprises a radially extending recess, said circumferential ends being received in said recesses.

8. A clutch disk as in claim 7 further comprising an elastic material in at least one of said recesses.

9. A clutch disk as in claim 1 wherein said support area comprises radial support means for supporting each said friction lining element against radially outward movement.

10. A clutch disk as in claim 9 wherein each said pair of circumferentially opposed support surfaces converges toward each other from the radial inside to the radial outside, said radial support means comprising said converging support surfaces.

11. A clutch disk as in claim 9 wherein said support area comprises a radial support section extending radially outward beyond each said friction lining element, said radial support means comprising said radial support section.

12. A clutch disk as in claim 2 comprising a pair of cover disk elements having respective ring shaped areas which are rigidly connected against each other to form said support area, said cover disk elements being axially bent away from each other adjacent to said apertures to form recesses which extend essentially radially, said circumferentially opposed support surfaces being formed in said recesses, said circumferentially opposed ends being received in said recesses.

13. A clutch disk as in claim 12 wherein said cover disk elements are rigidly connected together by rivets between said apertures, said cover disk elements adjacent to said apertures extending axially above said rivets, said friction linings extending axially above said cover disk elements adjacent to said apertures.

14. A clutch disk comprising
   a hub area designed for nonrotatable connection to a shaft,
   a support area arranged radially outside of said hub area, said support area having at least one pair of circumferentially opposed support surfaces which converge toward each other from radially inside to radially outside, and
   a friction lining element disposed between each said pair of circumferential support surfaces, each said friction lining element having a pair of circumferentially opposed ends which are supported by respective opposed support surfaces, each pair of opposed support surfaces supporting said friction lining element against radially outward movement.

15. A friction clutch comprising a clutch disk, said clutch disk comprising
   a hub area designed for nonrotatable connection to a shaft,
   a support area arranged radially outside of said hub area, said support area having at least one pair of circumferentially opposed support surfaces, and
   a friction lining element disposed between each said pair of circumferential support surfaces, each said friction lining element comprising a carrier element and at least one axially facing friction lining formed separately from said carrier element and fixed to said carrier element, each said carrier element having a pair of circumferentially opposed ends which extend circumferentially beyond said friction linings and are supported by respective opposed support surfaces.

16. A friction clutch as in claim 13 wherein said support area has a plurality of apertures arranged in circumferential sequence, a plurality of said friction lining elements being arranged in respective said apertures, each said aperture being bounded by a pair of said support surfaces.

17. A friction clutch as in claim 16 wherein said clutch disk comprises a pair of cover disk elements having respective ring shaped areas which are rigidly connected against each other to form said support area, said cover disk elements being axially bent away from each other adjacent to said apertures to form recesses which extend essentially radially, said circumferentially opposed support surfaces being formed in said recesses, said circumferentially opposed ends being received in said recesses.

18. A friction clutch as in claim 17 wherein said cover disk elements are rigidly connected together by rivets between said apertures, said cover disk elements adjacent to said apertures extending axially above said rivets, said friction linings extending axially above said cover disk elements adjacent to said apertures.

* * * * *